United States Patent [19]

Undin et al.

[11] 4,395,928

[45] Aug. 2, 1983

[54] HAND TOOL FOR STRIPPING INSULATION FROM WIRE

[75] Inventors: Hans Undin, Åkersberga; Hans Wiener, Täby, both of Sweden

[73] Assignee: C. A. Weidmüller GmbH & Co., Detmold, Fed. Rep. of Germany

[21] Appl. No.: 296,559

[22] Filed: Aug. 26, 1981

[30] Foreign Application Priority Data

Aug. 29, 1980 [SE] Sweden .................. 8006043

[51] Int. Cl.³ .................................. H02G 1/12
[52] U.S. Cl. ........................................... 81/9.5 A
[58] Field of Search ............... 81/9.5 R, 9.5 A–9.5 C; 30/90.1, 91.2

[56] References Cited
U.S. PATENT DOCUMENTS

| | | | |
|---|---|---|---|
| 3,125,908 | 3/1964 | Rozmus | 81/9.5 A |
| 3,596,541 | 8/1971 | Bieganski | 81/9.5 A |
| 3,915,037 | 10/1975 | Wiener | 81/9.5 A |
| 4,197,768 | 4/1980 | Undin | 81/9.5 A |
| 4,341,134 | 7/1982 | Yamazaki et al. | 81/9.5 A |

*Primary Examiner*—James L. Jones, Jr.
*Assistant Examiner*—Debra S. Meislin
*Attorney, Agent, or Firm*—Toren, McGeady and Stanger

[57] ABSTRACT

A hand tool for stripping insulation from the end of a wire includes a pair of gripping jaws for holding the wire and a pair of cutting and stripping jaws for removing the insulation. An actuating member is pivotally connected at one end to the cutting and stripping jaws and at the other end to a pivotally mounted driving member. When a pair of handles on the tools are pressed toward one another, the two pair of jaws engage the wire, one pair holding the wire while the other pair cuts and strips the insulation. During this operation, the actuating member displaces the cutting and stripping jaws away from the gripping jaws and pulls the cut insulation at least partly off the end of the wire.

12 Claims, 4 Drawing Figures

HAND TOOL FOR STRIPPING INSULATION FROM WIRE

SUMMARY OF THE INVENTION

The present invention is directed to a hand tool for stripping insulation from the ends of wire. The tool includes a first and a second handle and a first and a second gripping jaw. The gripping jaws are formed of a stiff or rigid material and are arranged to be pressed against the insulation on the wire. A body is formed integrally with the first gripping jaw and the first handle, with the second gripping jaw pivotally connected by a first pivot to the body. A second pivot connects the second handle to the body. The second handle has an extension projecting away from it beyond the location of the second pivot and the extension has an arcuate cam surface with a recess adjacent the opposite ends of the surface. In addition, the second gripping jaw has an extension projecting away from the gripping jaw and beyond the first pivot and a cam follower is located on the end of the extension spaced from the second gripping jaw. The cam follower cooperates with the cam surface. Positioned within the gripping jaws is a pair of cutting and stripping jaws held in the open position by a spring. An elongated actuating element is pivotally connected at one end to the cutting and stripping jaws and is arranged to displace the jaws in the longitudinal direction of and away from the gripping jaws.

A tool of this same general type is described in German patent specification No. 24 02 187 or in U.S. Pat. No. 3,915,037 issued to the applicants. A modified tool of a similar kind is described in "IBM Technical Disclosure Bulletin", No. 1/1965, pages 63–64, and another tool is disclosed in German Offenlungsschrift No. 22 00 516. In the IBM publication, as compared to the design shown in the German Offenlungsschrift No. 22 00 516, the tool has the advantage that both the gripping jaws and the stripping jaws are stiff and provide a sufficiently firm grip on the wire to be stripped and, further, the gripping jaws afford a firm hold on the wire. In the German Offenlegungsschrift No. 22 00 516, the stripping jaws are very long and elastically yieldable and the gripping jaws are also elastically yieldable. The tool disclosed in the IBM publication has the disadvantage that it cannot be used for wires of considerably different diameters because the mutual distance of the relatively long gripping claws in their closed state is determined by the abutment of the cam follower on the cam or control surface of the second handle.

It is the primary object of the present invention to improve a tool of the type described above so that the disadvantages experienced in the known designs are avoided or at least limited. In accordance with the present invention, a hand tool of the general type described above includes a separate driving member for displacing the actuating element. The driving member is pivotally mounted in the body but is not otherwise displaceable. Along one of its edge surfaces, the driving member has a control surface of a selected shape for contacting an engagement member. The driving member is pivotally displaceable relative to the two gripping jaws and the two handles. The engagement member is located on the extension projecting from the second handle so that it can contact the control surface on the driving member as the second handle is pivoted. In addition, the actuating element is pivotally connected to the driving member at a location spaced from the control surface.

A significant feature of the invention is the provision in the tool body of the separate and pivotally mounted driving member for operating the actuating element for the cutting jaws. Further, at least one of the pivots may displaceably connect the second gripping jaw and/or the second handle to the body so that the tool can be adjusted for use with wires of different thickness or diameter. The pivot affording such adjustment is movable at least in a part of its peripheral surface relative to the body substantially at right angles to the elongated direction of the first gripping jaw. As a result, the distance between the cam follower of the gripping jaw, which bears on the cam surface, and the axis of rotation of the cam surface is changed as is the spacing between the gripping jaws in the closed state of the tool. Another advantage of the invention is the inclusion of a cutting means, known per se in insulation strippers of other types, which can be operated by pressing the handles together so that the wire can be cleanly cut to size.

The various features of novelty which characterize the invention are pointed out with particularity in the claims annexed to and forming a part of this disclosure. For a better understanding of the invention, its operating advantages and and specific objects attained by its use, reference should be had to the accompanying drawings and descriptive matter in which there are illustrated and described preferred embodiments of the invention.

DETAIL DESCRIPTION OF THE INVENTION

Figure 1:
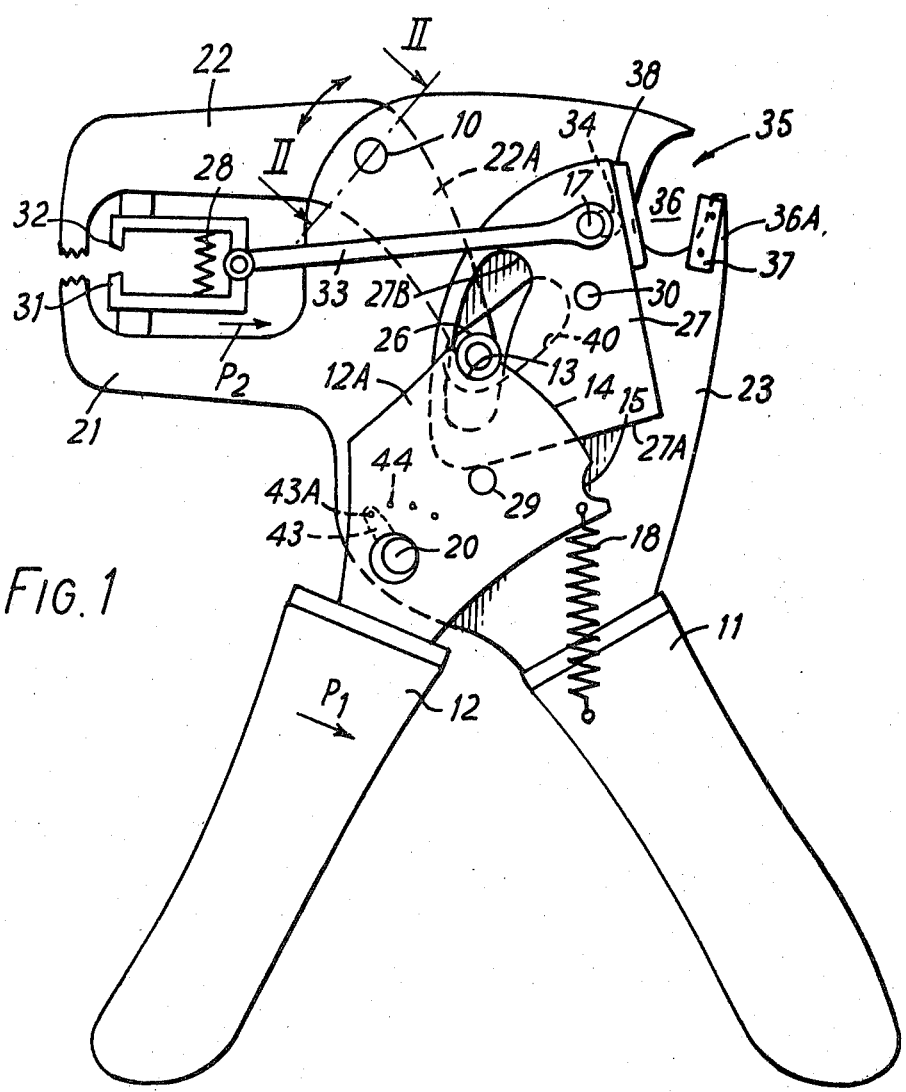
FIG. 1 is an elevational view of one embodiment of the hand tool incorporating the present invention.

In FIG. 1 a generally pistol-shaped hand tool is illustrated for stripping the insulation from wire. The tool includes a first handle 11 and an elongated first gripping jaw 21 formed as a unit with a body 23 of the tool. A second elongated gripping jaw 22 extending generally parallel to the first gripping jaw 21 is pivotally connected by a first pivot 10 to the body 23. Similarly, a second handle 12 is pivotally connected to the body 23 by a second pivot 20. The second handle 12 includes a first extension 12A projecting from the handle in its long direction. The second pivot 20 is located in the first extension 12A adjacent the second handle with a part of the first extension disposed on the opposite side of the second pivot from the second handle. The second extension 12A has an edge remote from the second handle forming an arcuate cam or control surface 14 with the center of curvature of this surface located in the second pivot 20. Adjacent each of the opposite ends of the surface 14 is a recess 13, 15. A helical spring 18 secured at one end to the first extension 12a and at its other end to the first handle 11 biases the tool into the open position.

Second gripping jaw 22 projects beyond the first pivot 10 forming a second extension 22A which extends at an obtuse angle relative to the part of the second gripping jaw 22 disposed in generally parallel relation with the first gripping jaw 21. A cam follower 26 is positioned on the free end of the second extension 22A, that is, the end more remote from the first pivot 10. Recesses 13, 15 in the cam or control surface 14 have the same peripheral shape as the cam follower 26. If the second handle 12 is pivoted toward the first handle 11 in the direction of the arrow $P_1$ against the biasing action of the spring 18, the cam follower moves onto the surface 14 and the first and second gripping jaws 21, 22 are closed and grip a wire, not shown, inserted into the tool.

When the cam follower 26 completes its passage over the surface 14 and reaches the recess 15, the gripping jaws 21, 22 are opened. This arrangement is known. It is also known to arrange a pair of pivoted cutting jaws 31, 32 between the pair of gripping jaws 21, 22 so that these cutting and stripping jaws are slidable relative to and in the elongated direction of the gripping jaws. Normally, a spring 28 holds the cutting or stripping jaws 31, 32 in the open position. An elongated actuating member 33 is pivotally connected at one end to the two cutting or stripping jaws 31, 32 for moving the jaws 31, 32 relative to the gripping jaws. When the gripping jaws are closed, cutting blades on the cutting or stripping jaws cut through the insulation of a wire inserted into the tool and then at least partially strip the cut insulation from the wire when the stripping jaws are displaced in the direction of the arrow $P_2$ by the actuating element 33.

In accordance with the invention, actuating element 33 is in the form of a rigid rectilinear rod pivotally connected, at its end remote from the cutting and stripping jaws, to a separate driving element 27. Driving element 27 is shaped like a sector of a circle and is connected to the body 23 of the tool by a third pivot 30. The driving element has one circularly curved edge and two rectilinear edges. One of the rectilinear edges forms a control surface 27A in the embodiment illustrated in FIG. 1.

Control surface 27A cooperates with an engagement member 29 located on the first extension 12A projecting from the second handle 12. To provide a certain delay between the time when the stripping jaws 31, 32 forced by the gripping jaws 21, 22, commence penetration into the insulation of the inserted wire, and the time when the stripping operation, effected by the driving element 27, is commenced, the pivot 17 connecting the actuating element 33 to the driving member 27 is firmly anchored to one of these parts and cooperates with an elongated hole 34 in the other of the parts. The elongated hole 34 forms a contactless path of predetermined length.

Due to the arrangement of the separate driving member 27 it is possible, among other things, to assure that the return movement of the cutting or stripping jaws 31, 32 takes place independently of the movement of the handle 12, since the shape of the control surface 27A may be selected at will. When insulation is stripped from a so-called flat wire, it is often desirable to move the separated insulation a small distance from the place where it is cut, but to leave the insulation on the wire as a protection for its end until the next working operation. Such a provision requires a special control of the stripping movement.

Figure 2:
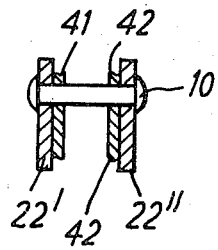
FIG. 2 is a cross-sectional view taken along the line II—II in FIG. 1.
Figure 3:
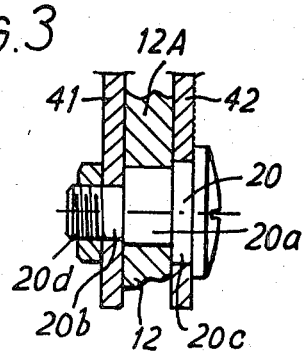
FIG. 3 is a cross-sectional view, on an enlarged scale, of one of the pivots in the tool shown in FIG. 1.
Figure 4:
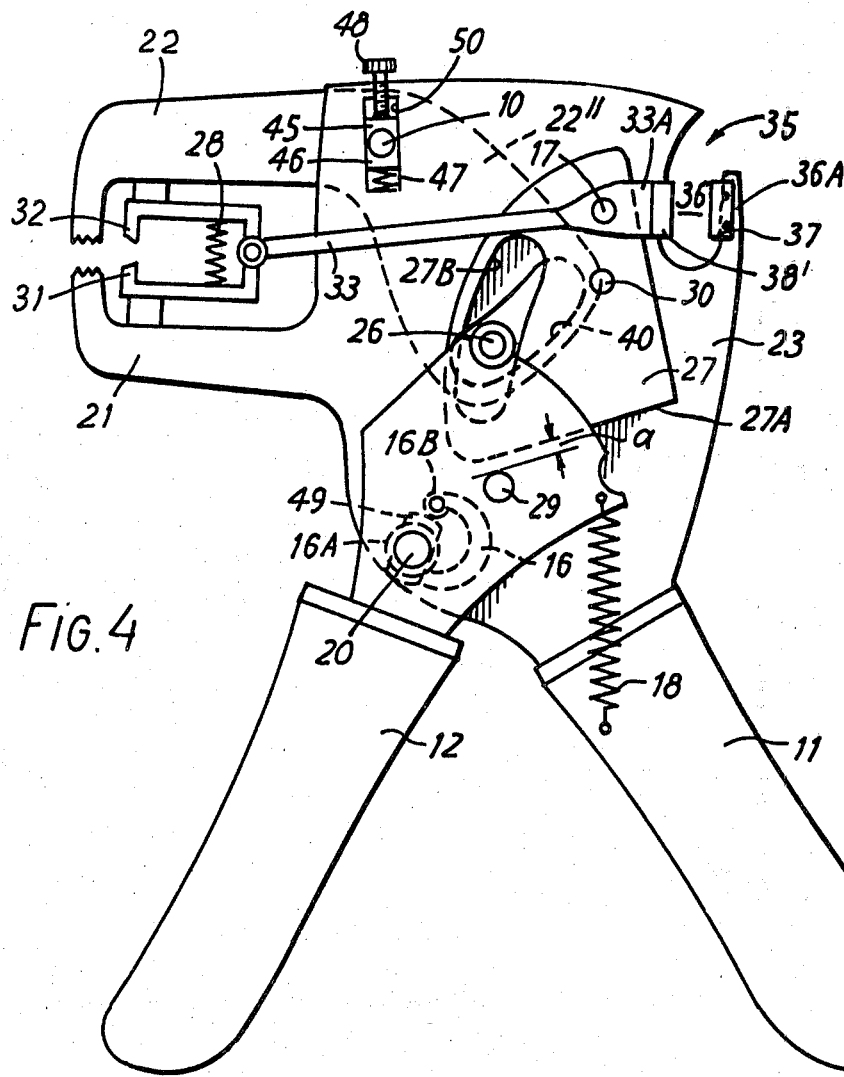
FIG. 4 is a view, similar to FIG. 1, illustrating a second embodiment of the hand tool incorporating the present invention.

Preferably, the body 23 of the tool has two laterally spaced side walls 41, 42, note FIGS. 2 and 3, and the second gripping jaw 22 also has two laterally spaced side walls 22', 22" which are located outwardly from and in contact with the side walls 41, 42 of the body. Each of the side walls 41, 42 of the body has a recess 40 and in the driving member 27 there is a recess 27B. Cam follower 26 connects the two side walls 22', 22" and passes with sufficient clearance through all of these recesses. In FIG. 4, preferably the side walls 22', 22" are of a sufficient width that they fully cover the recesses 40 in the side walls 41, 42 in each position of the second gripping jaw 22.

Second pivot 20 has the shape shown in detail in FIG. 3. In this preferred arrangement, the circumferential wall of the central part 20a of the second pivot carries the second handle 12 and is eccentric relative to the center axis of the second pivot while the circumferential walls 20b and 20c located on opposite sides of the central part 20a are concentric to the axis of the second pivot. The walls 20b and 20c mount the side walls 41, 42 of the body 23. By turning the second pivot 20 the cam surface 14, on the end of the first extension projecting from the second handle, is moved toward or away from the cam follower and changes the spacing of the gripping jaws 21, 22, particularly when they are in the closed position with the cam follower 26 bearing on the control surface 14. This feature enables adaptation to wires of different thickness or diameter.

In the embodiment illustrated in FIG. 3, the adjustment is effected using a screw driver after the nut threaded on the end 20d of the second pivot 20 has been loosened. Instead, as can be seen in FIG. 1, a resilient arm 43 can be fixed to the second pivot 20 and, at a position spaced outwardly from the second pivot, a pointed element 43a is provided on the arm and can be fitted into one of a number of spaced latching holes 44 in one of the side walls 41, 42.

The hand tool is also provided with a device 35 for cutting the wire. The device 35 includes a recess 36 in the body 23 of the tool with the long dimension of the recess extending substantially at right angles to the actuating element 33 and the recess is situated adjacent the end of the actuating element pivoted to the driving member 27. A fixed abutment element 36A is located on the side of the recess 36 more remote from the actuating element 33. The device includes at least one cutting blade 38, 38', 37. The cutting blade may be positioned on the driving member 27, on the side 36A of the recess 36 opposite the driving member, or on an extension 33A, note FIG. 4, of the actuating element 33 on the end of the actuating element 33 adjacent the pivot 17, note FIG. 4. If a wire, not shown, is inserted into the recess 36 it can be completely cut off by the cutting device 35. It will be appreciated that the fixed cutting blade 37 need not be used if the movable blade 38, 38' is moved up to the abutment 36A.

In the embodiment displayed in FIG. 4, for the same or similar parts as shown in FIG. 1, the same reference numerals are used. In FIG. 4, in the illustrated position of the second handle 12, the engagement member 29 is spaced from the control surface 27A at a preselected distance a so that the same delay effect is achieved as obtained by the elongated hole 34 in FIG. 1. The distance a affords a contactless path of a preselected length.

First pivot 10 is located in an adjustable bearing formed by two blocks 45, 46 which are displaceable between an adjustment screw 48 and a spring 47 in an elongated hole 50. It will be understood that by the displacement of the first pivot 10 the same effect is achieved as by the displacement of the second pivot 20.

In addition, FIG. 4 shows an alternative possibility for the displaceable arrangement of the second pivot 20. Second pivot 20 passes freely through an elongated hole 49 in the body 23 and is mounted in an opening (eye) 16A at one end of an arcuate spring 16. At its opposite end 16B, the spring 16 is riveted to the body 23. Preferably, a spring 16 is located on each side of the body 23 either inwardly or outwardly of the side walls 41, 42.

For each of the embodiments described above, the following applies: only one of the first pivot 10 and second pivot 20 must be adjustable and each of the pivots may be adjusted by the various illustrated possibilities and further other arrangements serving the same purpose (for instance the substitution of the screw 48 by a second spring 47 so that helical springs acting against each other are available). Either a "hard" manual adjustment (an eccentric pivot, an adjustment screw) or a "soft" automatic adjustment (arcuate spring, two helical springs acting against each other) may be obtained. The term "wire" as used in this description is intended to mean a core, a single-core wire, or a wire containing more than one core of round or flat configuration, depending on the shape of the gripping and stripping jaws, which are outside the scope of the present invention.

While specific embodiments of the invention have been shown and described in detail to illustrate the application of the inventive principles, it will be understood that the invention may be embodied otherwise without departing from such principles.

We claim:

1. A hand tool for stripping insulation from the end of a wire comprising a first elongated handle, a second elongated handle, a first elongated gripping jaw, a second elongated gripping jaw disposed opposite to and extending in the same elongated direction as and arranged to cooperate with said first gripping jaw for holding therebetween the insulation on the wire, a body formed integrally with said first handle and first gripping jaw, a first pivot located on said body and said second gripping jaw is pivotally mounted on said first pivot, a second pivot located on said body and said second handle is pivotally mounted on said second pivot, said second handle including a first extension projecting from said second handle in the elongated direction thereof with said second pivot located in said extension adjacent said handle, said first extension having an arcuate cam surface thereon spaced from and extending generally transversely of the elongated direction of said second handle, said cam surface having a recess adjacent each of the opposite ends thereof, said second gripping jaw including a second extension projection from said first pivot in the direction away from said second gripping jaw, a cam follower on said second extension spaced from said first pivot, said cam follower arranged to contact and cooperate with said cam surface on said first extension, a pair of cutting and stripping jaws positioned between said first and second gripping jaws, a spring in contact with said cutting and stripping jaws and biasing said cutting and stripping jaws into the open position, said cutting and stripping jaws having first ends arranged to cut and strip the insulation on the wire and second ends spaced from the first ends, an elongated actuating member is pivotally connected to the second ends of said cutting and stripping jaws for displacing said cutting and stripping jaws in the elongated direction of said gripping jaws, a driving member pivotally mounted on said body and connected to said actuating member for displacing said actuating member and said cutting and gripping jaws, an engagement member located on said first extension, said driving member having a control surface thereon, said control surface having a selected shape and arranged to contact said engagement member, said driving member being rotatable relative to said first and second gripping jaws and said first and second handles, and said actuating member is pivotally connected to said driving member at a location spaced from said control surface.

2. A hand tool, as set forth in claim 1, wherein said tool is pistol-shaped, said first handle is arranged at an obtuse angle relative to said first gripping jaw, and the second extension projecting from said second gripping jaw is arranged at an obtuse angle relative to said second gripping jaw.

3. A hand tool, as set forth in claims 1 or 2, wherein said control surface on said driving member is rectilinear.

4. A hand tool, as set forth in claim 3, wherein said driving member is shaped approximately as a sector of a circle having a first rectilinear side, a second rectilinear side and a circularly curved side, said first rectilinear side forms said control surface, said second rectilinear side being disposed approximately at right angles to said first rectilinear side, and the pivotal connection of said actuating member to said driving member is located adjacent said second rectilinear side.

5. A hand tool, as set forth in claims 1 or 2, wherein said body and said second extension projecting from said second gripping jaw are each formed by a pair of laterally spaced side walls, in the region of said second pivot said second handle being located between said side walls of said body and the side walls of said second extension being located outwardly of said side walls of said body, each said side wall of said body having a recess therein, said cam follower including a bolt interconnecting the side walls of said second gripping jaw and said bolt extending through the recesses in said side walls of said body.

6. A hand tool, as set forth in claim 5, wherein said side walls of said gripping jaws in the region of said second extension being sufficiently wide for covering the recesses in the side walls of said body.

7. A hand tool, as set forth in claim 5, wherein said driving member having a recess therein through which said bolt freely passes.

8. A hand tool, as set forth in claims 1 or 2 wherein in the initial position of said second handle a contact-free path of predetermined length is located between said driving member and at least one of the elements: actuating element and engagement member.

9. A hand tool, as set forth in claims 1 or 2, including cut-off means for cutting off a preselected part of a wire, said cut-off means including a recess in said body with said recess having a long dimension extending substantially perpendicularly to said actuating element and located adjacent the end of said actuating element secured to said driving member, a stationary abutment located on the elongated side of said recess more remote from said actuating element, and at least one cutting blade on one of said abutment element, said driving member or said actuating member.

10. A hand tool, as set forth in claim 9, wherein said blade is located on the opposite end of said actuating member from the end connected to said cutting and stripping jaws.

11. A hand tool, as set forth in claims 1 or 2, wherein at least one of said first and second pivots is movably displaceable relative to said body in a direction substantially at right angles to the elongated direction of said first gripping jaw for adapting said tool to wires of different thickness.

12. A hand tool, as set forth in claim 11, wherein at least one bearing mounts one of said first and second pivots and resilient elements are interposed between said bearing and said body.

* * * * *